| (12) | United States Patent | (10) Patent No.: US 7,446,886 B2 |
|---|---|---|
| | Aufmuth et al. | (45) Date of Patent: Nov. 4, 2008 |

(54) THREE-DIMENSIONAL RECONSTRUCTION OF SURFACE PROFILES

(75) Inventors: Claus Aufmuth, Neu-Ulm (DE); Claus Lörcher, Leinfelden-Echterdingen (DE); Christian Wöhler, Heroldstatt (DE)

(73) Assignee: Daimler AG, Stuttgart (DE)

( * ) Notice: Subject to any disclaimer, the term of this patent is extended or adjusted under 35 U.S.C. 154(b) by 198 days.

(21) Appl. No.: 10/574,381

(22) PCT Filed: Sep. 24, 2004

(86) PCT No.: PCT/EP2004/010729

§ 371 (c)(1),
(2), (4) Date: Jul. 17, 2006

(87) PCT Pub. No.: WO2005/033682

PCT Pub. Date: Apr. 14, 2005

(65) Prior Publication Data

US 2007/0041008 A1 Feb. 22, 2007

(30) Foreign Application Priority Data

Oct. 2, 2003 (DE) ................................ 103 46 481

(51) Int. Cl.
*G01B 11/24* (2006.01)
*G01B 11/04* (2006.01)
(52) U.S. Cl. ....................... 356/601; 356/638
(58) Field of Classification Search ................ 356/601, 356/613, 638; 250/559.22
See application file for complete search history.

(56) References Cited

U.S. PATENT DOCUMENTS 4,873,651 A 10/1989 Raviv

| 5,064,291 | A | 11/1991 | Reiser |
|---|---|---|---|
| 5,818,594 | A | 10/1998 | Lukander |
| 5,943,164 | A | 8/1999 | Rao |
| 5,986,763 | A | 11/1999 | Inoue |
| 6,111,602 | A * | 8/2000 | Kim ........................... 348/92 |

(Continued)

FOREIGN PATENT DOCUMENTS

DE 42 33 384 A1 4/1994

(Continued)

OTHER PUBLICATIONS

Zhang et al.: "Shape from Shading: A Survey," IEEE Transactions on Pattern Analysis and Machine Intelligence, 1999, pp. 690-706, vol. 21, No. 8, IEEE, US.

(Continued)

*Primary Examiner*—Roy M Punnoose
(74) *Attorney, Agent, or Firm*—Stephan Pendorf; Patent Central LLC

(57) ABSTRACT

A method for reconstructing the profile of structures on surfaces. According to said method, at least two images of the same area of the surface that is to be analyzed are evaluated, said images being recorded from a nearly vertical perspective, for example, and the surface being illuminated from different directions at a flat angle thereto. Elevations or depressions on the surface thus cast a distinct shadow in the recorded images, the position of which varies according to the incident light. Inclined areas can be identified by means of a brighter reflection. The vertical profile of a structure on the surface can be determined, and the shape of a fin can hence be reconstructed, for example, by analyzing shadow contours and outlines of bright areas. Even flat inclination changes can be determined by integrating the shape-from-shading process so as to evaluate brightness patterns such that a 3D reconstruction of the surface can be obtained, which matches the original well.

13 Claims, 8 Drawing Sheets

U.S. PATENT DOCUMENTS

| | | | |
|---|---|---|---|
| 6,907,138 B1 * | 6/2005 | Hoffman et al. | 382/154 |
| 7,092,106 B2 * | 8/2006 | Cox et al. | 356/602 |
| 2002/0118359 A1 | 8/2002 | Fairley et al. | |
| 2003/0137673 A1 * | 7/2003 | Cox et al. | 356/601 |
| 2006/0114477 A1 * | 6/2006 | Cox et al. | 356/602 |

FOREIGN PATENT DOCUMENTS

| | | |
|---|---|---|
| EP | 0 848 244 A2 | 6/1998 |
| GB | 2 297 616 A | 8/1996 |

OTHER PUBLICATIONS

Mandler et al.: "One-pass Encoding of Connected Components in Multi-Valued Images," In: Proc. 10th Intern. Conf. on Pattern Recognition, 1990, pp. 64-69, vol. 2, IEEE, US.

Hartt et al.: "A method for shape-from-shading using multiple images acquired under different viewing and lighting conditions," In: Proc. IEEE Computer Society Conf. on Computer Vision and Pattern Recognition, 1989, pp. 53-60, IEEE, US.

* cited by examiner

THREE-DIMENSIONAL RECONSTRUCTION OF SURFACE PROFILES

CROSS REFERENCE TO RELATED APPLICATION

This application is a national stage of PCT/EP2004/010729 filed Sep. 24, 2004 and based upon DE 103 46 481.6 filed Oct. 2, 2003 under the International Convention.

BACKGROUND OF THE INVENTION

FIELD OF THE INVENTION

The invention concerns processes for detecting and reconstructing structures of surfaces, such as for example elevations, grades, or dips.

Various processes are known, in which profiles of surfaces can be detected. Two different principles can be distinguished: on the one hand, those processes in which the surface to be characterized is directly sensed, for example mechanically, and on the other hand, the contactless techniques.

Mechanical sensing instruments, so called "profilometers," extend a sensing probe or needle in the manner of a grid over the surface of the sample and detect thereby the vertically changing surface profile via the changing positions of the needle tips. They are frequently employed where the objects to be distinguished and the there upon to be detected surface change area is not very large, since on the one hand a precise positioning of the sample piece under the sensor is necessary, and on the other hand the scanning type sensing of large areas is associated with a correspondingly large expenditure of time.

Contactless sensing processes use for example the reflection of ultrasound (the principle of the echolocation) or are based upon optical (for example laser scanner) or radar technical processes. Depending upon the area of employment, one or the other process may be more advantageous. Ultrasound processes are not suited for all environments nor for very large distances between object and sensor. For very large objects (for example earth surface) very precise elevation information is provided using for example radar altimetry; this however requires a technically sophisticated sensor and requires precise determination of sensor positions. Optical processes, in particular laser-based, require in general a relatively high calibration expense. A special optical process is stereometry, in which the surface to be examined is recorded using various views or perspectives and, from the evaluation of the slight stereoscopic deviations, the structures of the surface can be determined.

SUMMARY OF THE INVENTION

The present invention begins with the known optical process for detecting and reconstructing surface structures. It is concerned with the task of providing a new process, which is characterized by having broad applications.

BRIEF DESCRIPTION OF THE DRAWINGS

The inventive process is set forth in greater detail in the following on the basis of illustrative embodiments. Therein reference is made to the figures and the therein shown reference numbers. There is shown.

DETAILED DESCRIPTION OF THE INVENTION

Figure 1:
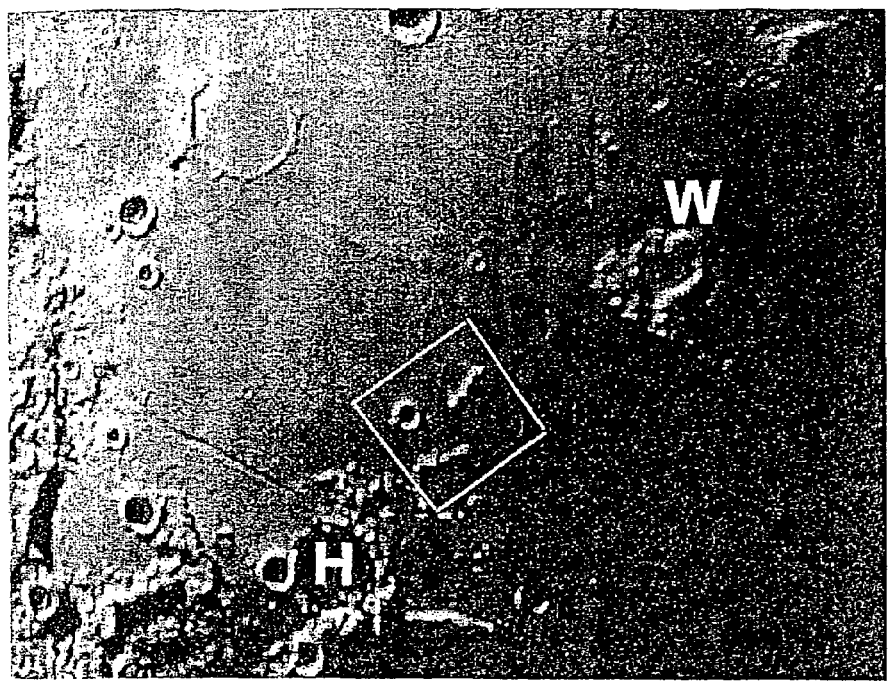
FIG. 1 image of a part of the moon surface.

The inventive process evaluates various images of the same area of the surface to be examined, wherein the images are recorded from a nearly vertical perspective with strongly differing light incident angles from different sides. The invention takes advantage of the fact that, in particular in the case of grazing or glancing light incident angle, that is, with an angle to the surface of approximately 10° and less, elevations or recesses on the surface can cast a significant shadow. The shape of the cast shadow is therein obviously directly dependent upon the form of the illuminated profile, that is, width, height and depth of the structure on the surface correlated with various contours of the cast shadow. Besides the analysis of the shadow contours, the inventive process also takes into consideration the various light reflections of appropriate areas of the surface, for example, for determining the course or contour of a ridge surface.

In the simplest case one records two images using grazing light, whereby the light is shined upon the structure from various, (for example opposite) sides with a flat angle. Preferably, however not necessarily, the camera position remains unchanged relative to the surface, since in this case the evaluation is simplified (identical pixel-coordinates for identical structures on the surface). If however the camera position changes, then these positional changes can be taken into consideration by appropriate corrections during the evaluation.

The thus obtained images were super-positioned in a first step for the further evaluation, such that corresponding image points (pixels) were superimposed (imaged structures covered each other). In the next step pixels corresponding to gray values were calculated into new image points by quotient formation. From two starting images with light intensity values $I_1$ or as the case may be $I_2$ there resulted thus two "quotient images" with pixel values $I_1/I_2$ or, as the case may be, $I_2/I_1$. By the quotient imaging areas with small albedo (reflection) (on other otherwise flat areas of the surface), which in the case of evaluation of only one starting image could be result in the light intensity differences being erroneously evaluated as a shadow, is annulled, since both starting images (the same angle of incidence of the light source is a precondition) for this area exhibit the same light intensity value, which is rectified during quotient formation. The quotient images then obtain—strongly contrasted—the cast shadow areas separated according to light incidence, that is each quotient image $I_1/I_2$ or as the case may be $I_2/I_1$ provides the areal of the cast shadow, which occurs respectively upon illumination of only one side.

In the next step the contours of the cast shadow-areals are extracted. This occurs for example by a "binary connected component" (BCC)—analysis of the quotient images (see E. Mandler, M. Oberlaender: One Pass Encoding of Connected Components in Multi-Valued Images, IEEE Int. Conf. on Pattern Recognition, pp. 64-69, Atlantic City, 1990). The thus obtained contours can be refined by a flattening processes, for example B-Spline-Interpolation (See D. F. Rogers: An Introduction to NURBS—With Historical Perspective, Academic Press, San Diego, 2001), in order to further increase the precision of the profile reconstruction beyond the pure resolution of the images (Image Point—Grid Pattern). Alternatively, the contours determined using for example s BCC-Algorithm could be used as initialization for a figmentation of the shadow boundaries on the starting images with active-contours (See D. J. Williams, M. Shah: A Fast Algorithm for Active Contours and Curvature Estimation, Computer Vision, Graphics Image Processing, 55, pp. 14-26, 1992).

If the contours of the cast shadows are separately determined for each light incident angle, then in the next step the course or profile of a rise of an elevation, or even steps, on the surface can be determined. For this it is presumed, that for example the side incident of light with a shallow angle from right forms a leftward cast shadow of a rise in the image of a shadow boundary, of which the right edge is formed by the rise of the elevation itself. The same applies analogously for the second image (illumination from left). The comparison of corresponding edge areas of shadow contours of both images provides for a grid pattern the same contour segments in both images (right edge of a shadow contour in Image A corresponds to the left edge of corresponding contour in Image B). A step on the surface provides, in distinction, a shadow contour on only one of the images.

For each point of a rise determined in this manner (or a step) the associated shadow length (stretching of a cast shadow parallel to the incident angle of the light source) can be taken directly from the extracted shadow contour. With known incident angle there is produced therefrom the elevation of the rise point (or, as the case may be, edge of a step) and therewith the height of the grid (or as the case may be the step).

In the last step the tilt surfaces on the surface are determined. The surface areas tilted towards the light source are significantly lighter in the images than the planar surface areas. These regions can be extracted from the image using, for example, a BCC-algorithm. For this, as selection criteria for the starting images, first a respective light intensity value $\theta_1$ or as the case may be $\theta_2$ is determined as threshold value, and then therewith only the regions are selected of which the image points are lighter than the predetermined threshold value $\theta_1$ or as the case may be $\theta_2$. Supplementally it is taken into consideration which of the thus selected areas are illuminated respectively only one of the two starting images and not in the other, that is, for the respective quotient image there applies $I_1/I_2 > \theta_0$ (or as the case may be $I_2/I_1 > \theta_0$), wherein $\theta_0$ is a predetermined threshold of the quotient image. The areas identified in this manner as tilt surfaces in this manner can be extracted again by means of BCC-algorithm and/or active contour process as contour gradients. In connection with the determined elevation profile (rise) the angle of tilt can be estimated (for example a flank of a rise or grade) and therewith finally the profile of the elevation can be reconstructed.

Figure 13:
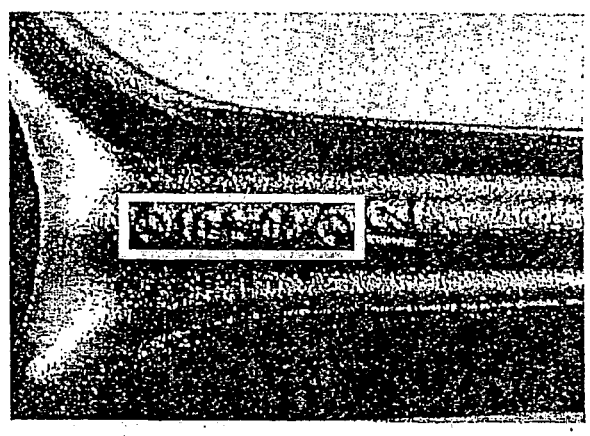
Figure 13:
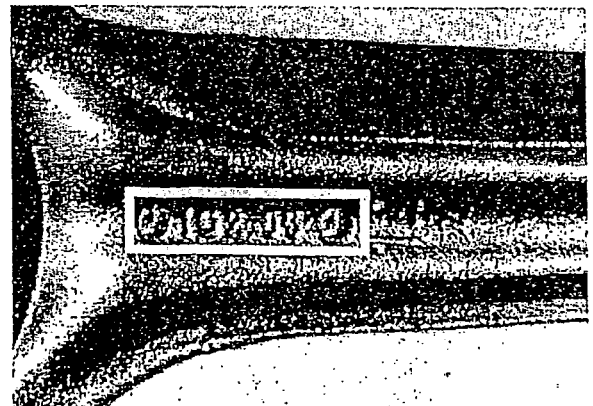
Figure 14:
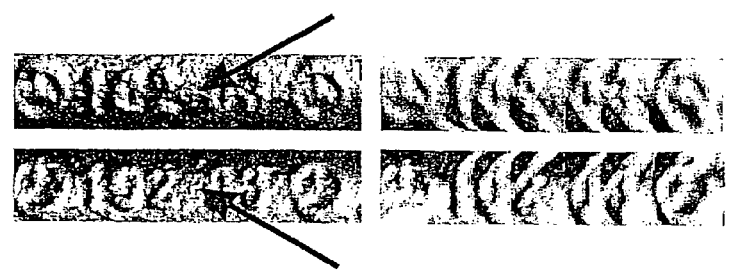
Figure 15:
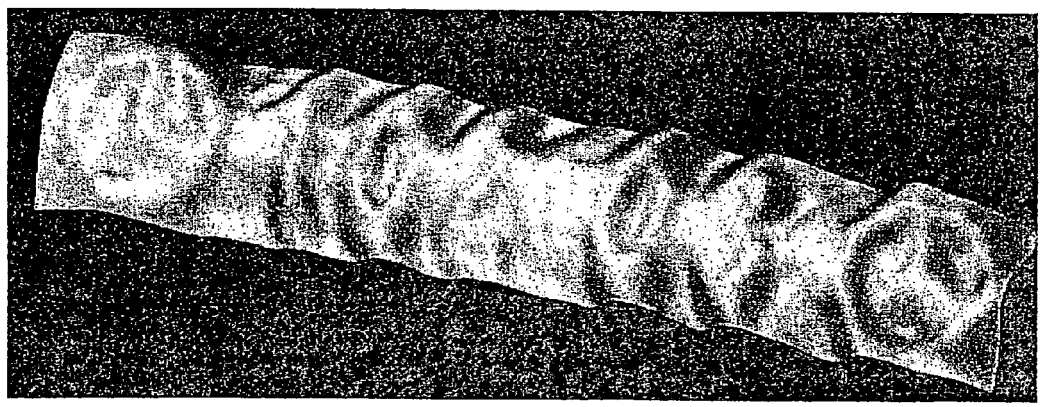

The contour of the flank is determinable herein only relatively approximately (linear increase). Changes of the course of the slope or also flat structures (low depressions, slight rises with small tilt) can however be determined by "shape-from-shading" (see X. Jiang, H. Bunke, Three Dimensional Computer Vision, Springer Publishers, Berlin 1997). Therein slight changes of the reflected light intensity are evaluated, in order, beginning with known geometric arrangement between camera, object and light source, to arrive at conclusions regarding the respective tilt of the reflected area. If one combines the inventive process with the shape-from-shading method, then surface profiles can be reconstructed with high quality. One example thereof is shown in FIGS. 13-15 (explanation can be found under Illustrative Example 3).

In particularly preferred manner, first the surface profile of the surface to be reconstructed is determined with suitable initialization by means of the shape-from-shading method. Subsequently, then, in particular advantageous manner, the angle between each flat element and the light incident direction applicable for the shadow image is so multiplied with a constant factor, that the average height or elevation differential in the reconstructed profile corresponds to the average height differential obtained by means of the above described shadow analysis. With this profile as initialization, a new surface profile is calculated by means of the shape-from-shading method. This process is iteratively repeated until the average change of the height profile between the two sequential iteration steps is smaller than a predetermined threshold value.

In the shape-from-shading methods known in the state of the art the surface profile is many times taken into consideration by the iterative minimization of an error function, which the deviation between the real and the from the surface profile reconstructed image are taken into consideration, as well as additional edge conditions placed upon the surface, such as for example flatness of the surface and integratability of the surface gradients. In particular manner this iterative minimization can be improved to the extent that, in the framework of the error function to be optimized in the iteration with the shape-from-shading method, an additive term is introduced. Therewith this additive term describes the deviation of the height difference determined in the previous iteration step in the light incident direction from the corresponding height differential determined by means of shadow analysis. For initialization of this advantageous iterative minimization there can be employed, in particularly preferred manner, the result obtained in the method described in the previous sentence.

In the described simplest case of an evaluation of only two images (for example left/right illumination) structures cannot be sufficiently detected which, on the basis of their position or shape (here for example course of a rise from left to right), provide practically identical images in both images. These structures can however be identified simply by repeating the process with illumination from other sides in corresponding manner (here for example above/below illumination), so that finally all profile parts can be reconstructed by repeated application of the process with different incident angle.

The inventive process is characterized by a very broad area of application. Surfaces of astronomical objects with great distances can be examined, as well as common products in the industrial manufacture, all the way to small structures under a microscope. Three examples of application of the surface profile determination and reconstruction illustrate this:

APPLICATION 1

Reconstruction of Structures on the Moon Surface

Figure 2:
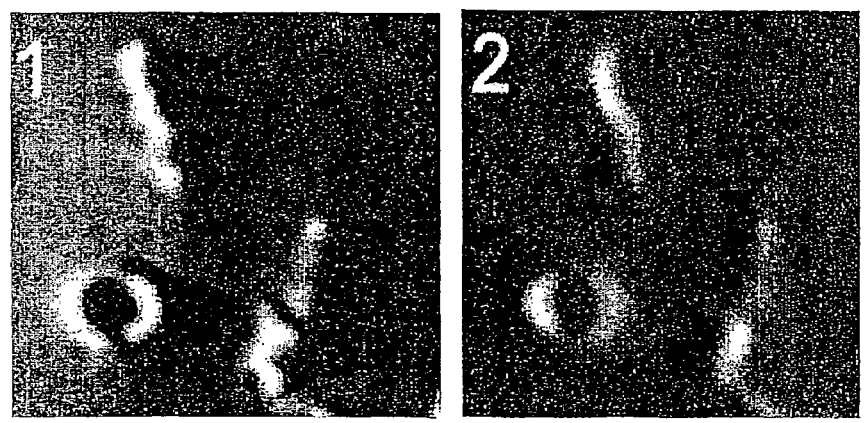
FIG. 2 detail view from FIG. 1 with varying light relationships 2.1 and 2.1.
Figure 3:
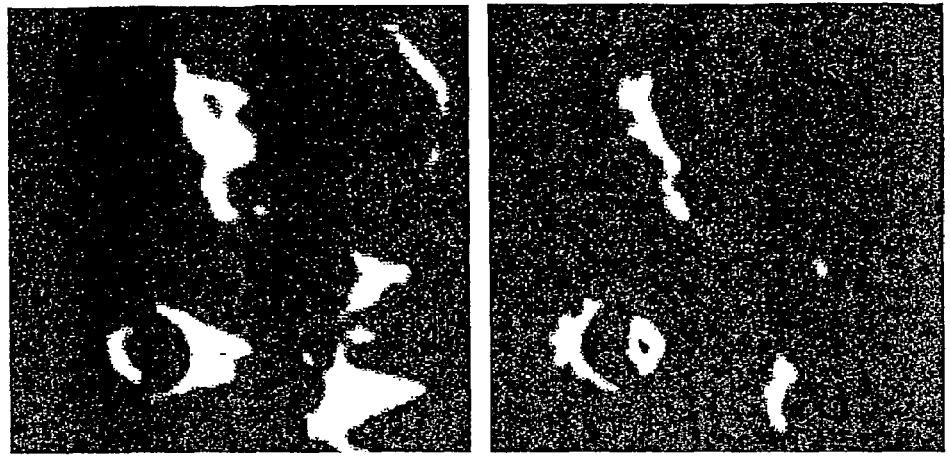
FIG. 3 extraction of the shadow fields from FIG. 2.1 and 2.2.
Figure 4:
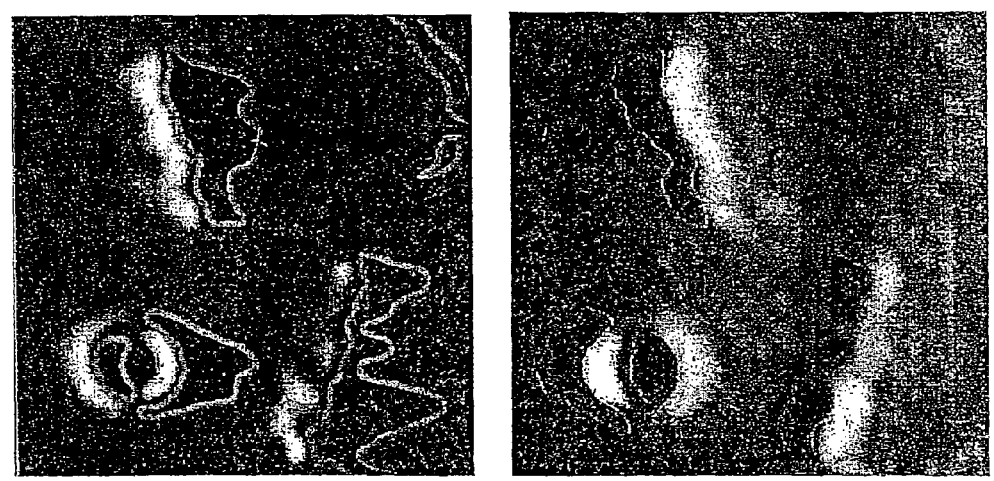
FIG. 4 accentuating the boundary lines of the shadow fields in FIG. 2.1 and 2.2, FIG. 5 supplemental accentuation of the course or contour of ridges and boundary lines about the flanks of the elevations, FIG. 6 profile reconstruction of the examined regions, FIG. 7 image of an approximately 0.5 cm high ridge on a metallic surface; light impinging from left and right, FIG. 8 calculated high profile of the ridge from FIG. 7, FIG. 9 perspective representation of the reconstructed grade, FIG. 10 image of a work piece surface with small defect; light impinging from left and right, FIG. 11 calculated height profile of structures on the work piece surface of FIG. 10, FIG. 12 image superimposition of color selective images of a surface contour, FIG. 13 stamping on a metal work piece; images with various light incident angles, FIG. 14 section from FIG. 13 with light incident directions (arrows) and reconstructed images, and FIG. 15 reconstruction of the stamping according to the inventive process with integrated shape-from-shading.
Figure 5:
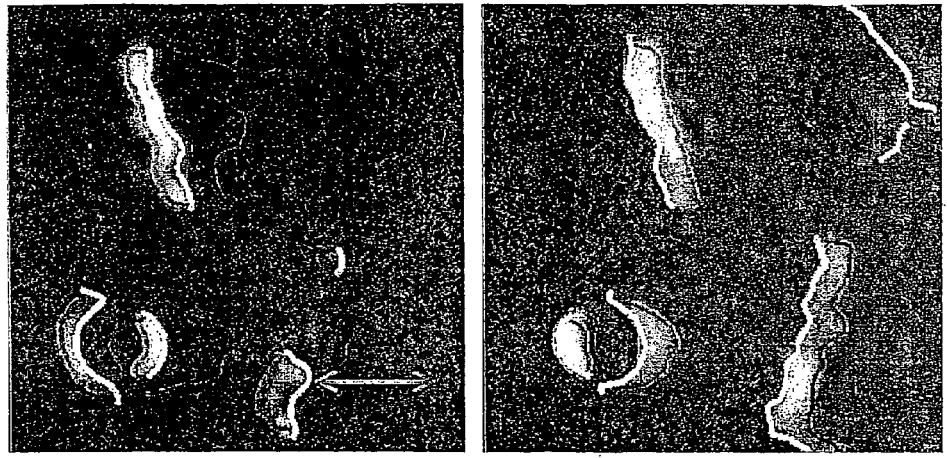

In FIG. 1 a part of the moon surface is reproduced, as it can be observed by a conventional telescope (here: 125 mm mirror telescope, 2600 mm focal point, CCD-camera). In the shown region the formation "Hesiodus" and "Wolf" can be recognized (hereafter referred to as H or as the case may be W). A detailed section approximately between these formations is shown amplified or contrast enhanced and enlarged in FIGS. 2.1 and 2.2. Therein the partial image 2.1 of this area shows a light incidence from left and partial image 2.2 the area with light incident from the right, wherein the incidence of some light is respectively at a flat angle of approximately 4° to the surface of the moon. Here the sideways shadow fields of the rises are clearly to be recognized. FIG. 3 shows the contrast amplified extraction of the shadow fields by computer imaging of the quotients $I_1/I_2$ (or as the case may be $I_2/I_1$) of the light intensity values of corresponding image points of both images. The therefrom determined BCC-analysis determined contours are entered as perimeter outlines in the respective partial image of FIG. 4. FIG. 5 shows in addition the determined perimeter outlines of the device or, as the case may be, crater flanks (lines about light areas), as well as the positions of the peaks of the rises or, as the case may be, crater edges as determined from the contours.

Figure 6:
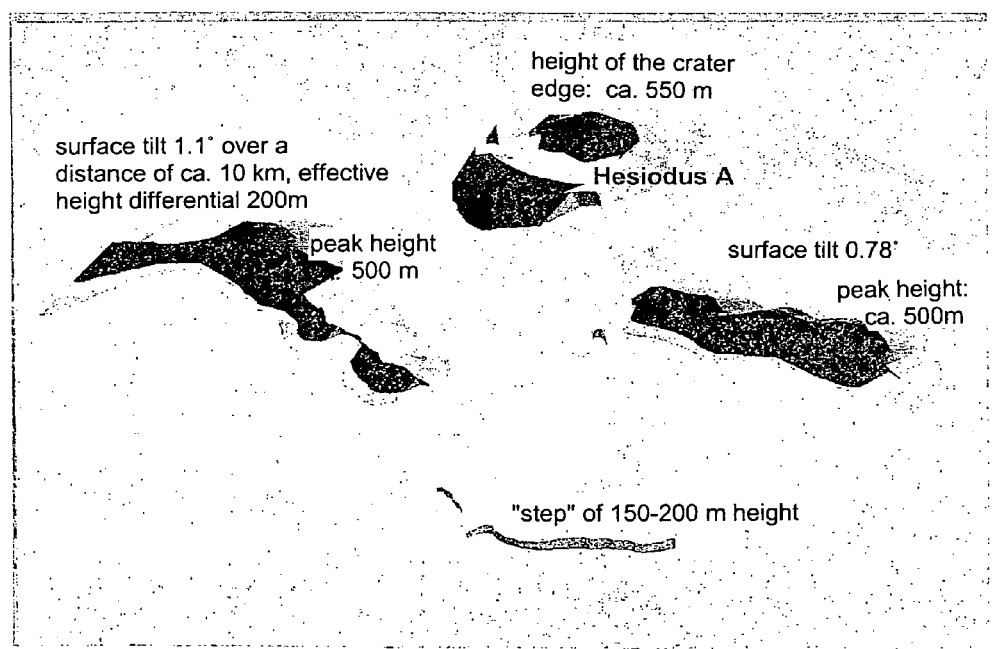

FIG. 6 shows a perspective representation of a reconstructive profile of the analyzed moon region.

APPLICATION EXAMPLE 2

Reconstruction of Structures on Work Pieces

In the area of the industrial quality control the inventive process can be used for example for surface checking of components. Therein various structures can be examined: burrs, welded seams, convex and concave deformations, contraction cavities and inclusions, etc. This is currently frequently accomplished by manual "feeling" or by means of photogrammetrics with very high calibration expense with laboratory equipment. By the new process the calibration expense becomes unnecessary. Besides this, in the case of a suitable camera F-stop, objects even with a comparatively large distance from the camera can be measured. The image recorded by the camera can therein supplementally be compared with stored images, for example from CAD-data produced image information ("wire model"), and thus also slight deviations from the intended profile can be detected.

Figure 7:
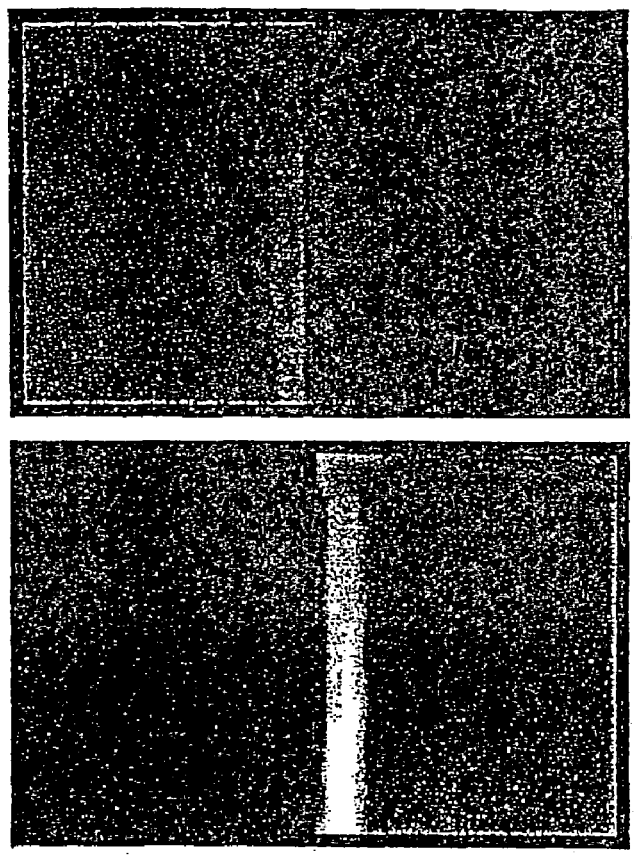
Figure 8:
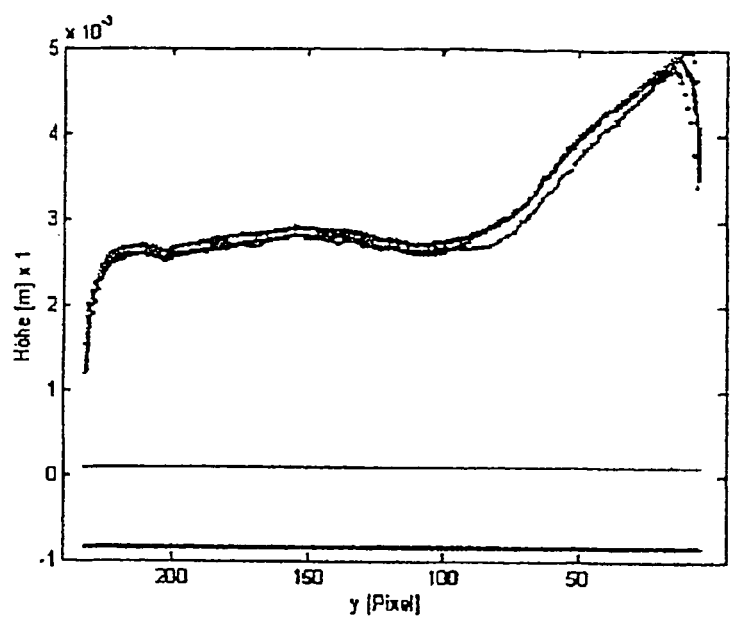
Figure 9:
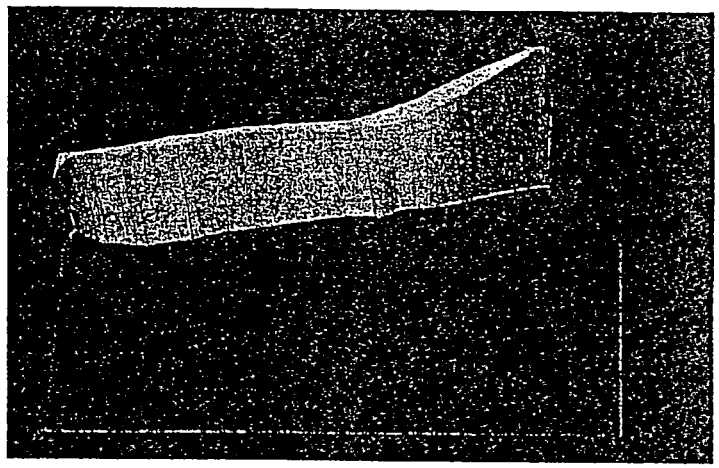
Figure 9:
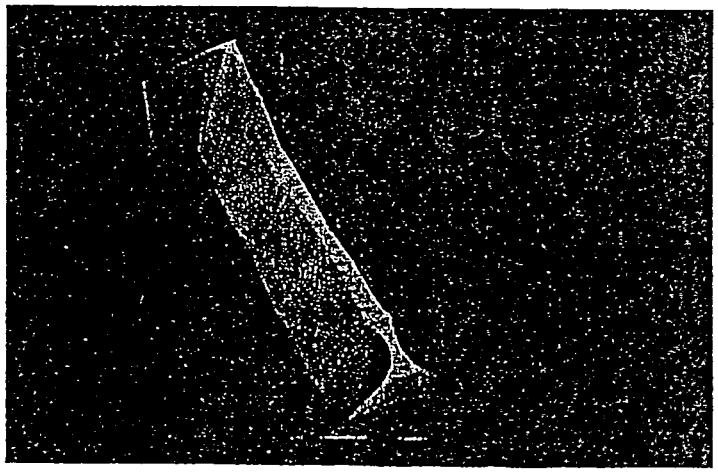

In the two partial images from FIG. 7 a device is reproduced upon an otherwise planar work piece surface, wherein the illumination is incident from left to right, on the other hand from right to left, at a flat or shallow angle to the surface. FIG. 8 shows the height profile determined in accordance with the invention from these images of the device, which exhibits a height of Up to approximately 5 mm. Two perspective views of the reconstructed burr are shown in FIG. 9.

Figure 10:
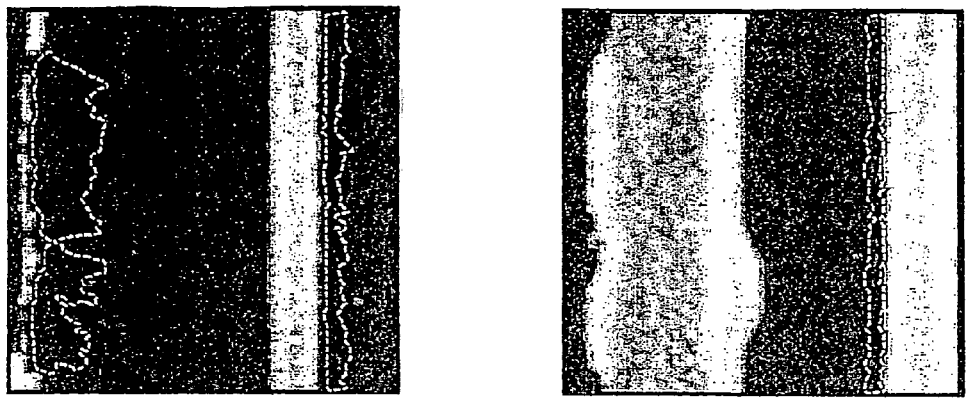
Figure 11:
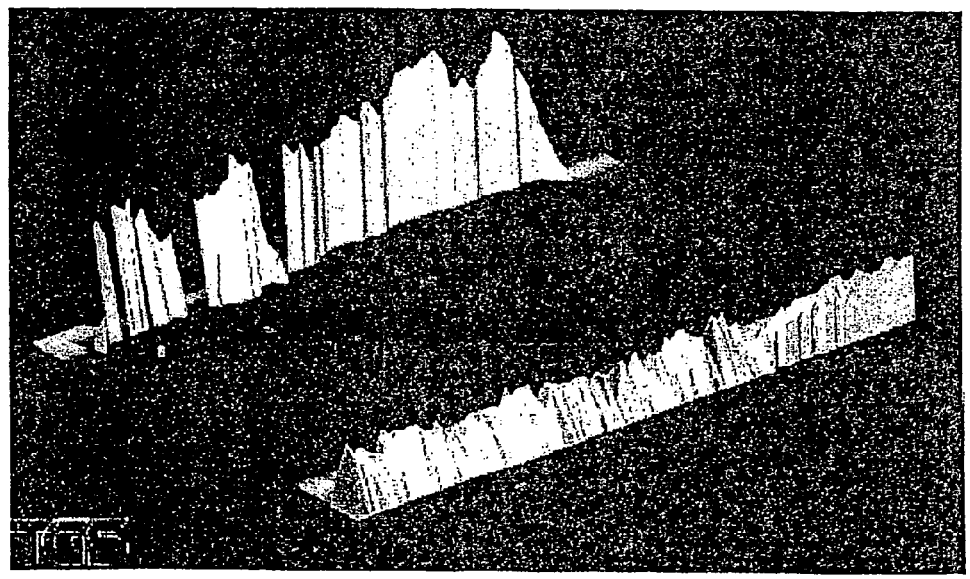

Further, significantly smaller structures can be thusly analyzed: FIG. 10 shows in two partial images (grazing or glancing illumination from different sides) of the surface segment of a further examined work piece (metal plate) with relatively small defects (two parallel running burrs). The burrs themselves are almost unrecognizable in the case of the perpendicular camera position, are however clearly visible by shadows of the burrs produced by side illumination (dashed lines). After evaluation of these images with the inventive process the profile of the burrs can be reconstructed as shown in FIG. 11. The height of the burr corresponds in this case to approximately 1.5 (or as the case may be 0.6 mm).

APPLICATION EXAMPLE 3

Reconstruction of a Stamping with Integrated "Shape-From-Shading"

FIG. 13 shows a work piece of metal with a stamping (section) with illumination from different sides. In FIG. 14 the segments are reproduced, the arrows indicate the direction of incidence of light, the right partial images are the reconstructions obtained following the inventive process. FIG. 15 is the perspective representation of the results of the integrated shape-form-shading, so that the reconstructed flanks and depressions have good correspondence with the original. The stamping depth corresponds in this example to approximately 0.4 mm.

The inventive process can be modified in various manners. For example, the illumination of the object to be examined can occur using a single light source, which is pivoted about the corresponding axis of rotation (based on camera to object). With the same result the light source can be locationally fixed and the object can be rotated (same axis of rotation).

Figure 12:
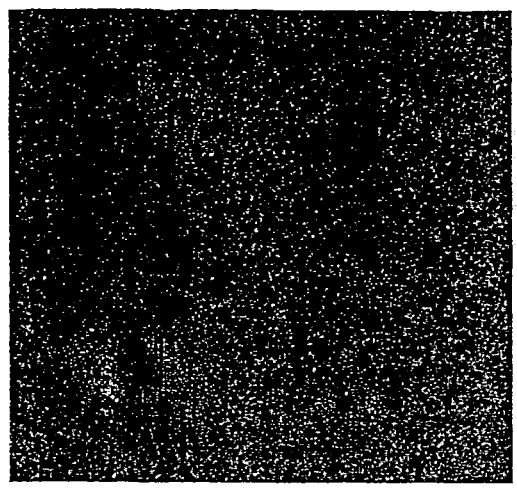

With multiple light sources, pivoting or rotation mechanisms can be dispensed with. Therein the images can record sequentially with respectively one turned-on light source. In the case of use of light sources of different wave length (for example red and green) the images can also be recorded simultaneously and be separated by color images of the respective illuminated images. As an example, FIG. 12 shows a super-positioning of such color filter images.

The term "light" is herein not limited to the visible spectrum, that is also IR or UV light sources can be employed with appropriate camera equipment.

For image recording, all cameras with appropriate resolution can be used. Basically there applies herein: higher resolution brings about higher reconstruction precision. Today's CCD-cameras offer high resolution and provide digital images, which are available directly for evaluation using EDV. Therewith, using commercially available components (camera, laptop, stand, light source) a transportable measuring device can be constructed for carrying out the process.

The invention claimed is:

1. A process for optical detection and reconstruction of surface profiles, comprising
   illuminating the surfaces to be examined from different directions with a shallow angle of incidence,
   recording images of the surface with a camera from a camera position with an acute angle to the surface, and
   extracting the contours of cast shadows on the recorded images and determining the elevation profiles or relief of structures based on light incidence angle and camera position.

2. A process according to claim 1, wherein the camera is provided nearly perpendicular to the surface.

3. A process according to claim 1, wherein the angle of incidence of the light is less than 10° to the surface.

4. A process according to claim 1, wherein the cast shadows on the images are extracted by formation of quotients of light intensity values of corresponding image points.

5. A process according to claim 4, wherein the contours of the cast shadows are determined by means of "binary-connected-component" method.

6. A process according to claim 1, wherein contours of bright light reflection on the images are also selected and evaluated for construction of strongly tilted areas of the surface, for example a raised flank.

7. A process according to claim 6, wherein the contours of bright light reflection are thereby determined, that the reflected light intensity exceeds a predetermined threshold value.

8. A process according to claim 1, wherein supplementally light intensity distributions are evaluated according to a shape-from-shading method and employed for reconstruction of the surface structures.

9. A process according to claim 8, wherein in the reconstruction of the surface contours first the surface profile of the surface to be reconstructed is determined by suitable initialization by means of shape-from-shading method,
wherein subsequently the angle between each surface element and the light incident angle responsible for the shadow image light incident direction is multiplied with a constant factor such that the average height difference on the reconstructive profile corresponds to the determined average height difference according to said extracting the contours of cast shadows on the recorded images and determining the elevation profiles or relief of structures based on light incidence angle and camera position,
wherein in the next step as initialization by means of the shape-from-shading method a new surface profile is calculated, and
wherein this process is iteratively repeated until the average change of the height profile between the two sequential iteration steps is smaller than a predetermined threshold value.

10. A process according to claim 9, wherein an iterative minimization of an error function in the framework of the shape-from-shading method is improved to the extent, that in the error function to be optimized a supplemental error term is added, wherein this added term corresponds to the deviation of the height difference in the light incident direction determined reconstructed height profile in the previous iteration step from the corresponding height difference determined by means of shadow analysis.

11. A process according to claim 9,
wherein an iterative minimization of an error function in the framework of the shape-from-shading method is improved to the extent, that in the error function to be optimized a supplemental error term is added, wherein this added term corresponds to the deviation of the height difference in the light incident direction determined reconstructed height profile in the previous iteration step from the corresponding height difference determined by means of shadow analysis,
wherein for initialization of the iterative minimization the result of the process according to claim 9, is employed,
wherein in the reconstruction of the surface contours first the surface profile of the surface to be reconstructed is determined by suitable initialization by means of shape-from-shading method,
wherein subsequently the angle between each surface element and the light incident angle responsible for the shadow image light incident direction is multiplied with a constant factor such that the average height difference on the reconstructive profile corresponds to the determined average height difference according to the above explained shadow analysis,
wherein in the next step as initialization by means of the shape-from-shading method a new surface profile is calculated, and
wherein this process is iteratively repeated until the average change of the height profile between the two sequential iteration steps is smaller than a predetermined threshold value.

12. A process for optical detection and reconstruction of planetary surface profiles, comprising
illuminating a planetary surface to be examined from different directions with a shallow angle of incidence,
recording images of the surface with a camera from a camera position with an acute angle to the surface, and
extracting the contours of cast shadows on the recorded images and determining the elevation profiles or relief of structures of the planetary surface based on light incidence angle and camera position.

13. A process for optical detection and reconstruction and inspection of surfaces of industrially manufactured components, comprising
illuminating the surfaces of an industrially manufactured component to be examined from different directions with a shallow angle of incidence,
recording images of the surfaces with a camera from a camera position with an acute angle to the surfaces and
extracting the contours of cast shadows on the recorded images and determining the elevation profiles or relief of structures of the industrially manufactured component based on light incidence angle and camera position.

* * * * *